United States Patent [19]

Nomura

[11] Patent Number: 5,117,311

[45] Date of Patent: May 26, 1992

[54] RETAINING DEVICE OF ANNULAR MEMBER

[75] Inventor: Hiroshi Nomura, Tokyo, Japan

[73] Assignee: Asahi Kogaku Kogyo Kabushiki Kaisha, Tokyo, Japan

[21] Appl. No.: 629,715

[22] Filed: Dec. 18, 1990

[30] Foreign Application Priority Data

May 25, 1990 [JP] Japan ................. 2-54884

[51] Int. Cl.⁵ .............................. G02B 7/02
[52] U.S. Cl. .................... 359/819; 354/286; 359/830
[58] Field of Search ............. 359/819, 820, 822, 827, 359/828, 830; 354/286

[56] References Cited

U.S. PATENT DOCUMENTS

| | | | |
|---|---|---|---|
| 2,732,751 | 1/1956 | Heidecke et al. | 359/830 |
| 3,336,902 | 8/1967 | Upton et al. | 359/819 |
| 3,671,108 | 6/1972 | Kilgus | 359/820 |
| 3,906,534 | 9/1975 | Shirasaki | 359/828 |
| 4,668,047 | 5/1987 | Okura | 359/820 |
| 4,733,945 | 3/1988 | Bacich | 359/820 |
| 4,929,054 | 5/1990 | Ahmad et al. | 359/820 |
| 4,929,073 | 5/1990 | La Plante et al. | 359/819 |

Primary Examiner—Loha Ben
Attorney, Agent, or Firm—Sandler, Greenblum & Bernstein

[57] ABSTRACT

A retaining device for an annular member is provided, which is connected to a supporting member including three supporting projections which are provided on the supporting member along an imaginary circle. Three elongated supporting holes are provided on the annular member and extend in radial directions therefrom, so that the supporting projections of the supporting member are fitted within the corresponding elongated supporting holes of the annular member.

15 Claims, 3 Drawing Sheets

RETAINING DEVICE OF ANNULAR MEMBER

BACKGROUND OF THE INVENTION

1. Field of the Invention

The present invention relates to the retaining device of an annular member, such as a circular lens.

2. Description of the Related Art

For example, a circular lens is fitted in the correspondingly circular opening of a lens holder and is retained at the peripheral edge by a lens retaining ring. The retaining ring is usually secured to the lens holder by set screws. However, in recent inexpensive lens holders made of molded plastic, no set screws can be used. Accordingly, the plastic lens holder has supporting projections (bosses) which are located along an imaginary circle coaxial to the circular lens to surround the circular opening. A plate like retaining ring (i.e., annular member) circular lens has a plurality of holes in which the supporting projections of the lens holder are fitted. The heads of the supporting projections which are fitted in the corresponding holes of the retaining ring are fused so as to be connected to the lens holder. By using the mechanism connecting the lens to the lens holder with the help of the retaining ring as mentioned above, manufacturing and assembling costs of the elements can be reduced.

In the connecting mechanism, the position and the diameter of the supporting projections of the lens holder must correspond to the position and diameter of the holes of the retaining ring as exactly as possible. However, it is very difficult to machine the lens holder and the retaining ring so as to precisely correspond the position and the diameter of the supporting projections of the lens holder to those of the holes of the retaining ring. If there is a slight deviation in position or disagreement in size, no assembly can be effected. To this end, the diameter of the holes of the retaining ring is made slightly larger than that of the supporting projections of the lens holder or the holes of the retaining ring are in the form of elongated holes. However, in this solution, the retaining ring tends to loosen (move relative to the lens holder) due to the slight clearance (play) between the supporting projections of the lens holder and the corresponding holes of the retaining ring. In such a situation where the retaining ring is secured to the lens holder with play by fusing the supporting projections as mentioned before, no precise positioning of the lens with respect to the lens holder or the retaining ring can be ensured. Furthermore, since the fusing conditions of the supporting projections depend on the size of the corresponding holes of the lens holder, no stable fusing can be realized.

SUMMARY OF THE INVENTION

The primary object of the present invention is to eliminate the above-mentioned drawbacks by providing a retaining device for an annular member in which when the supporting projections are fitted in the corresponding holes of the retaining ring, there is no displacement of the retaining ring, that is, there is no play between the supporting projections and the corresponding holes.

Another object of the present invention is to provide a retaining device for an annular member in which a plurality of supporting projections can be fused to be connected under the same fusing conditions.

To achieve the object mentioned above, according to the present invention, a retaining device for an annular member is provided which is connected to a supporting member comprising three supporting projections which are provided on the supporting member along an imaginary circle; and three elongated holes are provided on the annular member to extend in radial directions thereof, so that the supporting projections of the supporting member are fitted in the corresponding elongated holes of the annular member.

With this arrangement, the three supporting projections and the three elongated holes corresponding thereto make it possible to assemble the retaining device even if the tolerance in diameter of the supporting projections and the elongated holes is very strictly set.

The elongated holes of the retaining ring can be identical to each other. Such identical elongated holes enable the supporting projections which are made of synthetic resin to be stably fused so as to be connected under the same conditions.

The present disclosure relates to subject matter contained in Japanese Utility Model Application No. 2-54,884 (filed on May 25, 1990) which is expressly incorporated herein by reference in its entirety.

BRIEF DESCRIPTION OF THE DRAWINGS

The invention will be described below in detail with reference to the accompanying drawings, in which.

DESCRIPTION OF THE PREFERRED EMBODIMENTS

Figure 2:
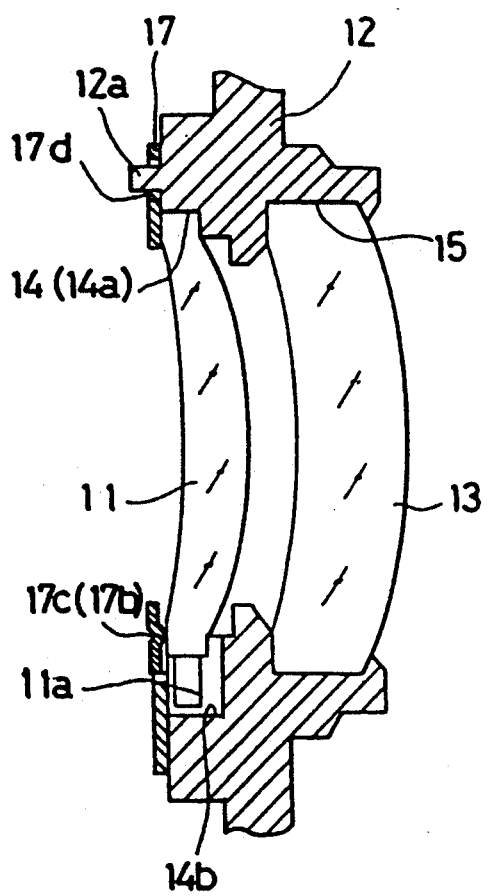
FIG. 2 is a sectional view taken along the line II—II in FIG. 1.

The illustrated embodiment is applied to a retaining device for a circular plastic lens 11, as a circular member. The plastic lens, which is made of molded plastic, has a gate portion 11a which was used as a sprue through which molten plastic was poured during molding and which radially projects from the outer periphery of the plastic lens 11 (FIG. 2). A lens holder (frame) 12 holds the plastic lens 11 and a glass lens 13. The lens holder 12 has holding portions (circular openings) 14 and 15 at its axial opposite ends. The holding portion 14 for the plastic lens 11 has a circular opening 14a and a recess 14b which radially extends from the circular opening 14a, so that the gate portion 11a is fitted in the recess 14b. The holding portion 15 for the glass lens 13 is in the form of a simple circular opening.

Figure 3:
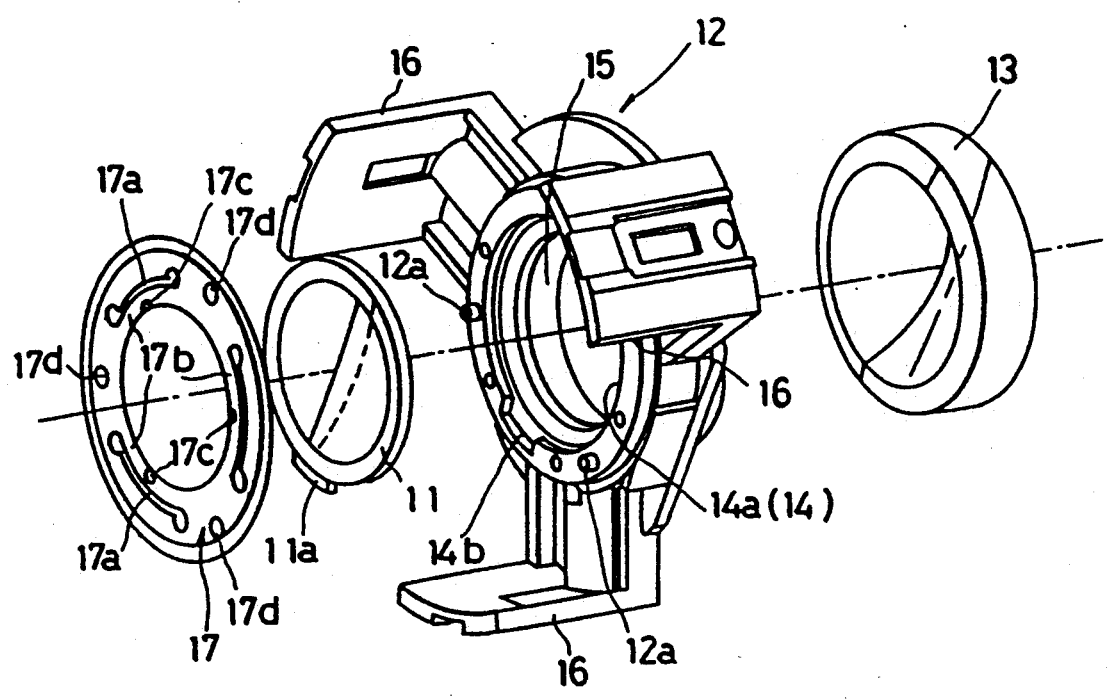
FIG. 3 is an exploded perspective view of a retaining device for an annular member as shown in FIG. 1.

The lens holder 12 constitutes a variable power lens group of a zoom lens together with another lens group. The lens holder 12 has a linear guide plate 16 (FIG. 3) which lies in a plane substantially parallel with the optical axis of the zoom lens to engage with a linear guide member of a lens barrel not shown.

The plastic lens 11 is secured to the lens holder 12 by a lens retaining ring 17 in a state in which the gate portion 11a is fitted in the recess 14b of the holding portion 14. The glass lens 13 is secured to the lens holder 12, for example by caulking the end of the holding portion 15.

The lens retaining ring 17 is made of leaf spring and has three arched holes or slots 17a which are spaced from one another at an equiangular distance along an imaginary circle having a center located at the center of ring 17, and which define three elastically deformable arched portions 17b located inside the associated arched holes 17a. The arched portions 17b have at their center portions projections 17c which come into contact with the plastic lens 11. The lens retaining ring 17 has three identical elongated supporting holes 17d which are spaced from one another at an equiangular distance of 120° along an imaginary circle coaxial to the ring between the adjacent arched holes 17a. The supporting holes 17d extend in a radial direction of the ring 17.

Figure 1:
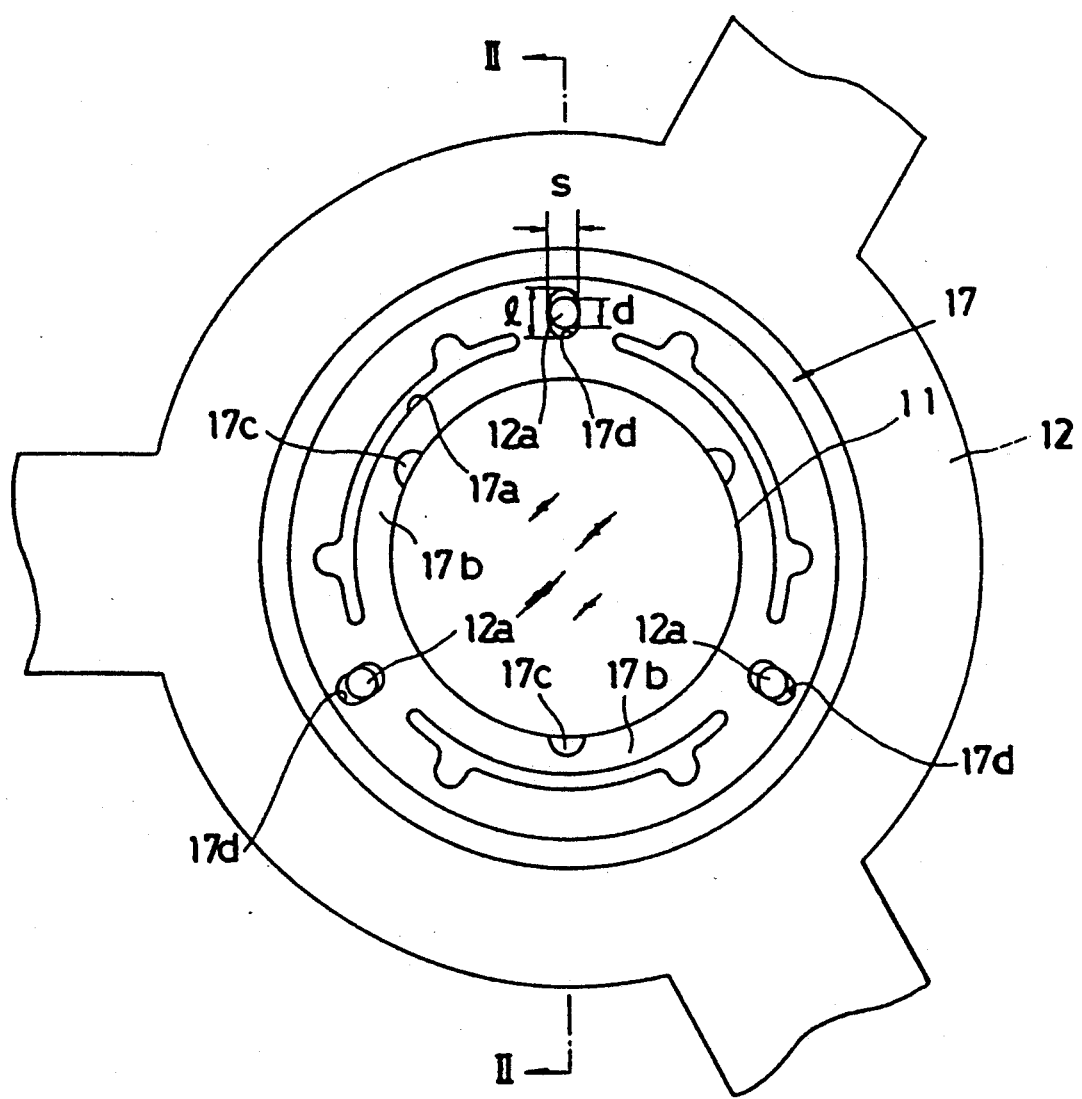
FIG. 1 is a front elevation view of the main part of a retaining device of an annular member according to the present invention.

The lens holder 12 has three supporting projections (bosses) 12a which each have a circular cross section and which are fitted in the corresponding supporting holes 17d of the lens retaining ring 17. The diameter d of the supporting projections 12a is slightly smaller than the width s of the elongated supporting holes 17d to provide a smallest clearance therebetween (FIG. 1). The position of the supporting projections 12a in the radial direction is such that the centers of the supporting projections 12a are located at the centers of the associated elongated supporting holes 17d.

In the arrangement as mentioned above, even if there is a slight error in position between the elongated supporting holes 17d and the supporting projections 12a, caused upon manufacturing, the supporting projections 12a of the lens holder 12 can be certainly fitted in the associated supporting holes 17d of the lens retaining ring 17, and there is no play therebetween after the supporting projections 12a are fitted in the corresponding supporting holes 17d. The reasons thereof are as follows.

Supposing that only two of the three supporting projections 12a are fitted in the corresponding supporting holes 17d, the fitting can be easily effected, since the length l of the elongated supporting holes 17d is sufficiently larger than the diameter of the supporting projections 12a. In this state, the lens retaining ring 17 is rotatable and movable within a range corresponding to the play between the supporting projection 12a and the associated supporting holes 17d of the length l. The displacement (including the rotational displacement) permits the remaining supporting projection 12a to be certainly fitted in the remaining supporting hole 17d. Namely, since the remaining (third) supporting hole 17d is an elongated hole extending in the radial direction of the lens retaining ring 17, the portion in which the remaining (third) supporting projection 12a can be fitted exists. Furthermore, since the width s of the supporting holes 17d and the diameter d of the associated supporting projections 12a are designed to minimize the clearance therebetween, as mentioned before, when all of the supporting projections 12a are fitted in the associated supporting holes 17d, no displacement of the lens retaining ring 17 takes place due to no play. The length l of the elongated supporting holes 17d is determined so as to perform the above-mentioned operation, taking the dimensional precision of the supporting projections 12a and the supporting holes 17d into account.

The heads of the supporting projections 12a are fused so as to be connected (e.g., by thermal caulking) after the lens retaining ring 17 is fitted therein. In this state, the projections 17c of the lens retaining ring 17 are elastically brought into contact with the plastic lens 11 by the elasticity of the elastically deformable arched portions 17b to retain the plastic lens 11 in the holding portion 14 of the lens holder 12. The fusing of the supporting projections 12a can be stably and uniformly effected under the same fusing condition, since all the supporting holes 17d are identical to each other.

Although the above discussion has been directed to the supporting and retaining device for the plastic lens 11, the present invention can be generally applied to any circular member other than a lens.

In the illustrated embodiment, the supporting projections 12a are fused so as to be connected to the lens holder 12. Alternatively, the present invention can be applied also to supporting projections 12a which are made of, for example, metal. In such an alternative, another securing means can be additionally provided to secure the lens retaining ring to the lens holder.

I claim:

1. A retaining device for an annular member which is connected to a supporting member comprising three supporting projections provided on the supporting member along an imaginary circle, said device comprising three elongated supporting holes provided on the annular member and extending in radial directions on said annular member, so that said supporting projections of said supporting member are adapted to be fitted in the corresponding elongated supporting holes of the annular member.

2. A retaining device for an annular member according to claim 1, wherein said supporting member is made of synthetic resin.

3. A retaining device for an annular member according to claim 2, wherein the supporting projections of the supporting member are thermally fused at their heads to the annular member when the supporting projections are fitted in the associated elongated supporting holes of the annular member.

4. A retaining device for an annular member according to claim 3, wherein said supporting member has a circular holding portion for holding a circular member therein, said supporting projections being located around the circular holding portion, said annular member being in contact with the peripheral edge of the circular member held in the circular holding portion to retain the circular member within the supporting member.

5. A retaining device for an annular member according to claim 4, wherein said circular member is a lens.

6. A retaining device for an annular member according to claim 5, wherein said annular member has arched holes located along an imaginary circle which is concentric with respect to the annular member, in order to define elastically deformable arched portions.

7. A retaining device for an annular member according to claim 6, wherein said elastically deformable arched portions have projections which come into elastic contact with the circular lens.

8. A retaining device for an annular member according to claim 7, wherein said elongated supporting holes of the annular member are identical to each other.

9. A retaining device for an annular member according to claim 8, wherein said elongated supporting holes of the annular member are located along an imaginary circle which is concentric with respect to the annular member.

10. A supporting device for a circular member, said device having a holder which has a holding opening in which the circular member is held and a retaining ring which retains the peripheral edge of the circular member in said holder, wherein said holder has three spaced supporting projections which are located along an imaginary circle which is substantially concentric with respect to the circular member, wherein said retaining ring has three elongated supporting holes in which the supporting projections are fitted, said elongated supporting holes extending in radial directions with respect to said retaining ring.

11. A supporting device according to claim 10, wherein said holder and said supporting projections thereof are made of synthetic resin.

12. A supporting device according to claim 11, wherein said supporting projections which are fitted in said elongated supporting holes have heads which are fused to the retaining ring.

13. A supporting device according to claim 12, wherein said supporting holes of the retaining ring are identical to each other.

14. A supporting device according to claim 13, wherein said elongated supporting holes of the retaining ring are located along an imaginary circle which is concentric with respect to the retaining ring.

15. A supporting device according to claim 14, wherein said circular member is a lens.

* * * * *